United States Patent
Keith, Jr.

[15] 3,695,058
[45] Oct. 3, 1972

[54] FLEXIBLE LINK ROTATABLE DRIVE COUPLING

[72] Inventor: Marvin W. Keith, Jr., 1623 South Blvd., Evanston, Ill. 60202

[22] Filed: May 26, 1971

[21] Appl. No.: 147,104

[52] U.S. Cl............................................64/23, 64/31
[51] Int. Cl...............................................F16d 1/10
[58] Field of Search............................64/23, 31, 2, 4

[56] References Cited

UNITED STATES PATENTS

| | | | |
|---|---|---|---|
| 2,586,360 | 2/1952 | Mall | 64/23 |
| 2,643,528 | 6/1953 | Hammarbach | 64/23 |
| 3,187,521 | 6/1965 | Morris et al. | 64/23 |

*Primary Examiner*—Edward G. Favors
*Attorney*—R. S. Sciascia, J. A. Cooke and R. J. Erickson

[57] ABSTRACT

A flexible link coupling for transmitting rotational movement includes a flexible flat link of trapezoidal configuration having its narrow end pivotally connected to a driven member by a transverse pin and its wide end slidably received diagonally within an elongate square hole in a driving member. This coupling accommodates both angular misalignment and relative axial movement while transmitting rotational movement from the driving member to the driven member.

5 Claims, 4 Drawing Figures

PATENTED OCT 3 1972 3,695,058

INVENTOR

Marvin W. Keith Jr.

BY

ATTORNEYS

FLEXIBLE LINK ROTATABLE DRIVE COUPLING

BACKGROUND OF THE INVENTION

The present invention relates generally to flexible shaft couplings and more particularly to flexible shaft couplings which accommodate axial displacement and/or axial misalignment between rotatable shafts.

In certain applications, it is desirable to couple together a pair of rotatable shafts which may not be precisely aligned axially; while certain other applications require similar couplings which additionally are telescopic to accommodate relative axial movement between the shafts. For example, in the ordnance arming fuze disclosed in application Ser. No. 858,670, filed Sept. 17, 1969, now U.S. Pat. No. 3,601,059 by George S. Briggs, an arming pin is threadedly received within the fuze housing and is adapted to be rotatably driven by an air vane when the air vane is freed for rotation upon release of the ordnance device by a launching aircraft. Due to the high velocity airstream encountered by the vane, the threaded arming pin is rapidly rotated and axially withdrawn from its initial position. In that device, and in other devices wherein the available driving force is of limited magnitude, any axial misalignment between the shafts produces sufficient binding or jamming of the fine threads on the arming pin to the extent that the driving force is incapable of imparting rotational movement to the arming pin. When this occurs, the arming cycle is disrupted and the ordnance device malfunctions.

SUMMARY OF THE INVENTION

Accordingly, it is an object of this invention to provide an efficient and reliable mechanical coupling between two rotatable shafts.

Another object of the present invention is to provide a mechanical coupling between two rotatable shafts which may be axially misaligned.

Still another object of this invention is the provision of an inexpensive telescopic mechanical coupling between axially misaligned rotatable shafts and which will eliminate chatter in screw threads on one of the shafts.

A further object of the instant invention is to provide an improved rotatable drive coupling of economical design.

Briefly, in accordance with one embodiment of this invention, these and other objects are attained by providing a flat trapezoidal flexible link which has one end thereof slidably received diagonally within a rectangular bore formed in a tubular driving head and which has its other end pivotally attached to the driven rotatable shaft. With the wide end of the trapezoidal link received diagonally in the square hole formed in the driving head, the link is free to rotate about the occupied diagonal, to rotate about the transverse axis of the other diagonal and to translate parallel to the axis of the head, thus permitting movement in three degrees of freedom. With the narrow end of the link pivotally connected to the driven shaft and the link free to flex in a cantilever mode, the device compensates for axial misalignment between the driving head and the driven shaft without causing jamming of the screw threads of the driven shaft within its threaded mounting member.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
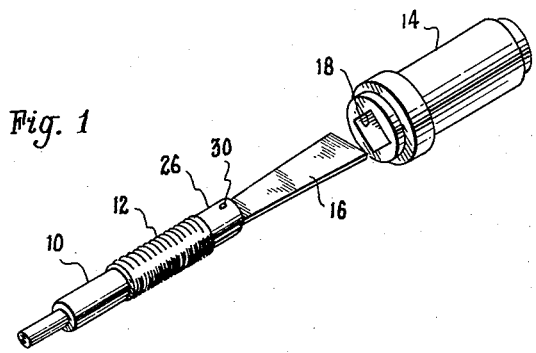
FIG. 1 is a perspective view of the rotatable drive coupling of the present invention.

Referring now to the drawings wherein like reference characters designate identical or corresponding parts throughout the several views, and more particularly to FIG. 1 thereof, an elongate shaft 10 is provided with external screw threads 12 formed externally thereon along a portion of the length of the shaft for engagement with an internally threaded support member, not shown. Shaft 10 is adapted to be rotatably driven within its threaded support member by an elongate tubular head 14 through a flat flexible link 16. Tubular head 14, which is adapted to be rotatably driven by an air vane or other suitable means, is provided with an elongate longitudinal bore 18 which has a square cross-sectional configuration for slidably receiving the flat link 16 diagonally therein, as more clearly shown in FIG. 2. The flat flexible link 16 is preferably formed in a trapezoidal configuration so that, when the wide end of the link is received diagonally within the square bore 18 of the tubular head 14, the link makes contact with the interior of the square bore only at corners 20 and 22 at the base of the trapezoidal link.

Figure 2:
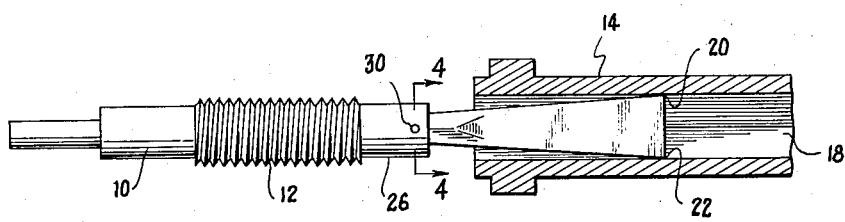
FIG. 2 is a side elevation partially in section of the assembled rotatable drive coupling of the present invention.
Figure 3:
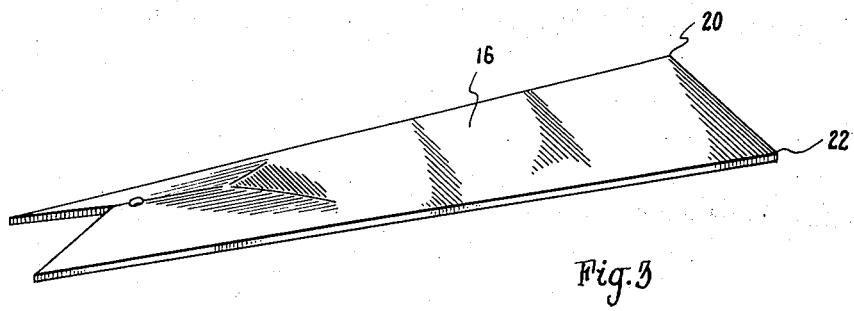
FIG. 3 is an enlarged perspective view of the flexible link portion of the present invention.
Figure 4:
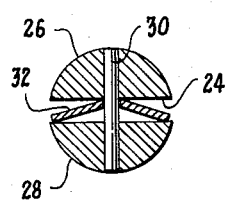
FIG. 4 is a sectional view taken along line 4—4 of FIG. 2.

Referring now to FIGS. 2 and 4, the narrow end of the trapezoidal link is received within a slot 24 defined by a pair of opposed arms 26 and 28 on a bifurcated end portion of the shaft 10. The narrow end of the flexible link is pivotally held between the opposed arms 26 and 28 of the shaft 10 by means of a pin 30 which extends in a direction transverse to the axis of the shaft and through aligned apertures formed in the two arms and the link. As best seen in FIGS. 3 and 4, the narrow end of the flexible link is provided with a V-shaped crimped portion 32 which effectively increases the thickness of the link at its narrow end portion which is then wedgingly inserted into slot 24 between the opposed arms 26 and 28. The wedged fitting of crimped portion 32 within slot 24 increases the frictional drag of the pivotal connection at pin 30 which helps to prevent "chatter" of threads 12 when shaft 10 is rapidly rotated.

From the foregoing, it will be appreciated that the motion transmitting means of this invention readily compensates for any axial misalignment between the threaded shaft 10 and the tubular head 14 since the trapezoidal link 16 is pivotally connected to the shaft 10 by the hinge pin 30 and the wide end of the link contacts the square bore 18 only at the corners 20 and 22 of the link. The trapezoidal link 16 is therefore free to pivot about corners 20 and 22 and rotate about the occupied diagonal of the square bore 18. It is also free to rotate about the transverse axis of the other diagonal and is further free for translational movement within the bore parallel to the axis of the tubular head. Thus, rotational movement imparted to the head 14 is transmitted to the threaded shaft 10 through link 16 and, as the shaft 10 is rotated in its threaded mounting, translational movement of the shaft 10 is taken up by sliding contact of the corners 20 and 22 of the link within the square bore. Even though the rotary motion transmitted through the flexible coupling may be of a high rotational velocity, the threads 12 on the shaft 10 do not bind or chatter because sufficient frictional drag is imparted thereto by means of the flexing of the link 16 in its cantilever mode and by the frictional drag of the crimped portion 32 within the slot 24. The rotatable coupling of this invention therefore compensates for extreme misalignment between the tubular driving head 14 and the driven shaft 10 and permits telescopic movement therebetween while also preventing chatter or binding of the threaded portion of the shaft 10. The coupling of this invention therefore provides improved functional reliability.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A mechanical coupling for transmitting rotary motion comprising:
   a tubular hub having a longitudinal bore of rectangular cross-section extending therethrough and being adapted to be coupled to a rotary driving means,
   an elongate shaft, and
   a flat flexible link having a first end thereof secured to one end of said shaft and having a second end thereof slidably received diagonally within said rectangular bore.
2. The device of claim 1 wherein:
   said flat link is of trapezoidal configuration having a narrow end and a wide end, said link being secured to said shaft at its narrow end and having its wide end slidably received diagonally within said rectangular bore.
3. The device of claim 2 wherein:
   said one end of said shaft has a bifurcated portion forming a pair of opposed arms with a slot therebetween,
   the narrow end of said trapezoidal link being received in said slot, and
   a pivot pin extending through aligned apertures in said bifurcated arms and in said narrow end of said link to pivotally connect said link to the bifurcated end portion of said shaft.
4. The device of claim 3 wherein:
   said elongate shaft having external threads formed along a portion of the length thereof which are adapted to engage an internally threaded mounting member for supporting said shaft for rotational and longitudinal movement.
5. The device of claim 3 wherein
   said link includes a transversely curved portion on the narrow end thereof which is wedgingly received within said slot in the bifurcated end portion of said shaft.

* * * * *